United States Patent [19]
Barker et al.

[11] Patent Number: 5,744,265
[45] Date of Patent: Apr. 28, 1998

[54] LITHIUM CELL HAVING MIXED LITHIUM—METAL—CHALCOGENIDE CATHODE

[75] Inventors: Jeremy Barker; M. Yazid Saidi, both of Henderson, Nev.

[73] Assignee: Valence Technology, Inc.

[21] Appl. No.: 665,106

[22] Filed: Jun. 13, 1996

[51] Int. Cl.$^6$ .............................. H01M 4/48; H01M 4/58
[52] U.S. Cl. ........................ 429/218; 429/220; 429/224
[58] Field of Search ................................. 429/218, 220, 429/224; 252/182.1

[56] References Cited

U.S. PATENT DOCUMENTS

| | | | |
|---|---|---|---|
| 4,172,927 | 10/1979 | Toyoguchi et al. | 429/220 X |
| 4,246,253 | 1/1981 | Hunter . | |
| 4,608,324 | 8/1986 | Fuji et al. | 429/220 X |
| 4,828,834 | 5/1989 | Nagaura et al. . | |
| 5,135,732 | 8/1992 | Barboux et al. . | |
| 5,196,279 | 3/1993 | Tarascon . | |
| 5,418,090 | 5/1995 | Koksbang et al. . | |
| 5,425,932 | 6/1995 | Tarascon . | |
| 5,470,678 | 11/1995 | Yumiba et al. | 429/220 X |
| 5,576,121 | 11/1996 | Yamada et al. | 429/220 |

FOREIGN PATENT DOCUMENTS

| | | | |
|---|---|---|---|
| 0154765 | 9/1982 | Japan | 429/220 |
| 62-190657 | 8/1987 | Japan . | |
| 1-163969 | 6/1989 | Japan . | |

OTHER PUBLICATIONS

J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994 no month.

R.J. Gummow, A. deKock, M.M. Thackeray, "Improved Capacity Retention in Rechargeable 4 V Lithium/Lithium-–Manganese Oxide (Spinel) Cells", Solic State Ionics, vol. 69, 1994 no month.

H. Huang and P.G. Bruce, "A 3 Volt Lithium Manganese Oxide Cathode for Rechargeable Lithium Batteries", J. Electrochem. Soc., vol. 141, No. 7, Jul. 1994.

J. Gopalakrishnan, "Chimie Douce Approaches to the Synthesis of Metastable Oxide Materials", Chemistry of Materials, American Chemical Society, vol. 7, No. 7, Jul. 1995.

A.R. Wizansky, P.E. Rauch, and F.J. Disalvo, "Powerful Oxidizing Agents for the Oxidative Deintercalation of Lithium from Transition–Metal Oxides", Journal of Solid State Chemistry, 81, 203–207, 1989 No month.

F. Sapiña, J. Rodríguez–Carvajal, M.J. Sanchis, R. Ibañez, A. Beltrán, and D. Beltrán, "Crystal and Magnetic Structure of $Li_2CuO_2$", Solid State Communications, vol. 74, No. 8, 779–784, 1990 No month.

R. Berger and L.E. Tergenius, "Room Temperature Synthesis and Structural Characterization of Monoclinic $LiCuO_2$ by X–ray and Neutron Diffraction", Journal of Alloys and Compounds, 203–207, 1994 No Month.

K. Imai, M. Koike, H. Takei, H. Sawa, D. Shiomi, K. Nozawa, and M. Kinoshita, "Preparation, Crystal Structure and Magnetic Property of a New Compound $LiCuO_2$", Journal of The Physical Society of Japan, vol. 61, No. 5, 1819–1820, May 1992.

(List continued on next page.)

*Primary Examiner*—Anthony Skapars
*Attorney, Agent, or Firm*—Linda Deschere

[57] ABSTRACT

The invention provides a new positive electrode active material having increased capacity and a method for operating an electrochemical lithium cell or battery which has the new positive electrode active material composition. The positive electrode comprises first and second lithium-containing active materials which are different from one another. The invention provides the ability to overcome first cycle inefficiency typically observed when using a single lithium-containing metal chalcogenide by adding a small amount of a second lithium-containing metal chalcogenide, preferably lithium copper oxide.

11 Claims, 3 Drawing Sheets

OTHER PUBLICATIONS

M.T. Weller and D.R. Lines, "Structure and Oxidation State Relationships in Ternary Copper Oxides", Journal of Solid State Chemistry, 82, 21–29, 1989 No Month.

J. Barker, "Three Electrode Electrochemical Voltage Spectroscopy (TEVS): Evaluation of a Model Lithium Ion System", Electrochimica Acta, vol. 40, No. 11, 1603–1608, 1995 No Month.

J.M. Tarascon, E. Wang, F.K. Shokoohi, W.R. McKinnon, and S. Colson, "The Spinel Phase of $LiMn_2O_4$ as a Cathode in Secondary Lithium Cells", J. Electrochem. Soc., vol. 138, No. 10, 2859–2864, Oct. 1991.

J.M. Tarascon and D. Guyomard, "Li Metal–Free Rechargeable Batteries Based on $Li_{1+x}Mn_2O_4$ Cathodes ($0 \leq X \leq 1$) and Carbon Anodes", J. Electrochem. Soc., vol. 138, No. 10, 2864–2868, Oct. 1991.

LITHIUM CELL HAVING MIXED LITHIUM— METAL— CHALCOGENIDE CATHODE

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells containing electrochemically active (electroactive) materials. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. Cells having metallic lithium anode and metal chalcogenide cathode are charged in an initial condition. During discharge, lithium ions from the metallic anode pass through the liquid electrolyte to the electrochemically active (electroactive) material of the cathode whereupon electrical energy is released.

Batteries with anodes of metallic lithium are described in U.S. and foreign patents and contain metal chalcogenide oxidizing agents as the cathode active material. Such materials include $CuF_2$, $CuS$, $CuO$, $FeS$, $CdF_2$, and $MnO_3$. The reaction with $CuO$ (cupric oxide) is typical and is $2Li+CuO=Li_2O+Cu$, giving rise to still another metallic species, the Cu. These batteries are not rechargeable because the lithium from the metallic anode is converted to lithium oxide ($Li_2O$), lithium fluoride (LiF), or lithium sulfide ($Li_2S$). Such non-rechargeable batteries are called primary batteries. Sometimes a lithium-containing species was added to the electrode to achieve an average voltage between that of the metal chalcogenide oxidizing agent and the lithium-containing species. The oxidizing metal chalcogenide with their attendant disadvantages are described for example in U.S. Pat. Nos. 3,711,334; 3,393,092; and Japanese Patent Nos. 1-163969 and 62-190657. Such batteries are very undesirable because electrodes containing metallic lithium readily degrade, form high surface area metallic powder, and react violently with moisture and air.

It has recently been suggested to replace the lithium metal anode with an intercalation anode, such as a lithium metal chalcogenide or lithium metal oxide. A carbon anode such as coke and graphite are also intercalation materials. Such negative electrodes are used with lithium containing intercalation cathodes, in order to form an electroactive couple in a cell. Such cells, in an initial condition, are not charged. In order to be used to deliver electrochemical energy, such cells must be charged in order to transfer lithium to the anode from the lithium containing cathode. During discharge the lithium is transferred from the anode back to the cathode. During subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNO_2$. The cobalt compounds are relatively expensive and the nickel compounds are difficult to synthesize. A relatively economical positive electrode is $LiMn_2O_4$, for which methods of synthesis are known, and are reactions generally between stoichiometric quantities of a lithium containing compound and a manganese containing compound. Common precursors are, for example, lithium salt, $MnO_2$, lithium hydroxide, and acetate compounds as disclosed in U.S. Pat. Nos. 4,246,253 and 5,135,732. The $LiMn_2O_4$, like the nickel and cobalt compounds, has a disadvantage in that the charge capacity of a cell comprising such cathode suffers a significant loss in capacity. That is, the initial capacity (Amp hours/gram) available from $LiMn_2O_4$, $LiNO_2$, and $LiCoO_2$ is less than the theoretical capacity because less than 1 atomic unit of lithium engages in electrochemical reaction. Such initial capacity value is significantly diminished during the first cycle operation and such capacity further diminishes on every successive cycle of operation. Assuming that the entire theoretical capacity of $Li_1Mn_2O_4$ was available for electrochemical reaction the specific capacity at best is 148 milliamp hours per gram. As described by those in the field, the best that one might hope for is reversible capacity on the order of 110 to 120 milliamp hours per gram. Obviously, there is a tremendous difference between the theoretical capacity assuming all lithium is extracted from $LiMn_2O_4$ and the actual capacity when 0.8 lithium is extracted as observed during operation of a cell. In U.S. Pat. No. 4,828,834 Nagaura et al attempted to reduce capacity fading by sintering precursor lithium salt and $MnO_2$ materials and thereby forming an $LiMn_2O_4$ intercalation compound. However, Nagaurals $LiMn_2O_4$ compounds suffered from a very low capacity.

There remains the difficulty of obtaining a lithium containing chalcogenide electrode material having acceptable capacity without disadvantage of significant capacity loss when used in a cell.

SUMMARY OF THE INVENTION

The invention provides a new positive electrode active material having increased capacity and a method for operating an electrochemical lithium cell or battery which has the new positive electrode active material composition. The positive electrode comprises first and second lithium-containing active materials which are different from one another. The first and second materials are each lithium-containing intercalation compounds, desirably lithium-containing metal chalcogenides, and preferably lithium-containing metal oxides. The first active material has an electrochemical potential versus lithium which is less than the electrochemical potential versus lithium of the second active material. The first active material has a higher specific capacity (milliamp hours per gram), versus a metallic lithium counter-electrode, than the second active material. On a weight basis, the first active material has a greater proportion of lithium than the second active material. Advantageously, both of the active materials are relatively air stable and moisture stable. Both the first and second active materials are capable of releasing and inserting lithium ions. However, the first active material does so at a lower voltage versus lithium, than that of the second active material. Accordingly, the first active material is capable of oxidation and reduction of lithium ions at a lower voltage relative to the second active material. It is preferred that the first active material be lithium copper oxide. The second active material is selected from among lithium-containing metal chalcogenide compounds and is desirably a lithium-containing metal oxide, and preferably is lithium manganese oxide, $LiCoO_2$ and $LiNiO_2$. Preferably, the lithium copper oxide is represented by the nominal general formula $Li_2CuO_2$ and the exemplary second active material, lithium manganese oxide is represented by the nominal general formula $Li_1Mn_2O_4$. Upon oxidation and reduction, the lithium copper oxide is represented by the nominal general formula $Li_{2-x}CuO_2$ where x varies as x greater than or equal to zero and less than or equal to 2.

The invention provides the ability to overcome first cycle inefficiency typically observed when using a single lithium-containing metal chalcogenide by substituting for such metal chalcogenide an amount of a second metal chalcogenide, preferably lithium copper oxide. The lithium copper oxide contains 2 formula units of lithium per formula unit of the copper oxide. The lithium copper oxide is preferably in an initial, as prepared, condition represented by the preferred $Li_2CuO_2$. The amount of lithium which is reversibly removed and reinserted into the positive electrode active material is greatly enhanced over that observed when a single lithium metal chalcogenide electrode is cycled in a cell with a carbon or graphite counter-electrode. Any amount of the first active material (lithium copper oxide) constituent added to the positive electrode active material will improve performance. Generally, the positive electrode of the invention comprises about 1 percent to about 50 percent by weight of the $Li_2CuO_2$, with the balance constituted by the second active material (lithium metal oxide) for which performance is to be enhanced. Since the performance of the cell will be improved as any amount of the second active material (lithium metal oxide; i.e., $LiMn_2O_4$) is replaced by the first active material ($Li_2CuO_2$), there is no practical lower limit as to the amount of the first active material ($Li_2CuO_2$) so included, so long as it is greater than zero. Preferably, the maximum amount of the capacity enhancing constituent (i.e., $Li_2CuO_2$) is in the range of about 1 percent to 20 percent, constituting a minor amount, by weight of the total active material. For example, a mixture of about 10/90 parts by weight $Li_2CuO_2/LiMn_2O_4$ provides enough lithium copper oxide to nearly precisely compensate for the first cycle capacity loss typically observed in a cell having a lithium manganese oxide positive electrode and a graphite negative electrode.

In the case where a substantial amount of the first active material, lithium copper oxide, is substituted for the second active material (i.e., $LiMn_2O_4$) the performance is greatly enhanced because the presence of the lithium copper oxide provides the ability to cycle the cell at more than 1 voltage plateau of the second active material (i.e., $LiMn_2O_4$). For example, in the case of $LiMn_2O_4$, some of the lithium will cycle on the 4 volt plateau and the balance will cycle on the 3 volt plateau of the lithium manganese oxide. The combination of available capacities at the 3 and 4 volt plateaus of the lithium manganese oxide greatly increases the capacity of the electrode. Note that the lithium is deintercalated from the lithium copper oxide for intercalation into the lithium manganese oxide, generally at voltages above the voltage of the copper oxide plateau. Accordingly, this exemplary cell configuration advantageously boosts the amount of lithium ion cycled into and removed from the lithium manganese oxide, to a value greater than 1, when both the 4 volt and 3 volt plateaus of the lithium manganese oxide are utilized. This corresponds to a substantial saving of active material compared to conventional cells which do not contain the lithium copper oxide additive (dopant). Although cycling of more than 1 plateau is possible with the exemplary $LiMn_2O_4$, it is not a general characteristic of metal chalcogenides. For example, the $LiNiO_2$ and the $LiCoO_2$ would benefit from the addition of $Li_2CuO_2$ to compensate for first cycle inefficiency, but they do not cycle at more than 1 plateau. The active material of the negative electrode is any material compatible with the lithium copper oxide positive electrode active material. Metallic lithium may be used as the negative electrode active material where lithium is removed and added to the metallic negative electrode during use of the cell. The negative electrode is desirably a non-metallic intercalation compound.

Objects, features, and advantages of the invention include an improved electrochemical cell or battery based on lithium which has improved charging and discharging characteristics, a large discharge capacity, and which maintains its integrity during cycling. Another object is to provide a cathode active material which combines the advantages of large discharge capacity and with lesser capacity fading. It is also an object of the present invention to provide positive electrodes which can be manufactured more economically and relatively more conveniently, rapidly, and safely than present positive electrodes which react readily with air and moisture. Another object is to provide a method for forming cathode active material which lends itself to commercial scale production providing for ease of preparing large quantities.

These and other objects, features, and advantages will become apparent from the following description of the preferred embodiments, claims, and accompanying drawings.

Detailed Description of the

Preferred Embodiments

Figure 1:
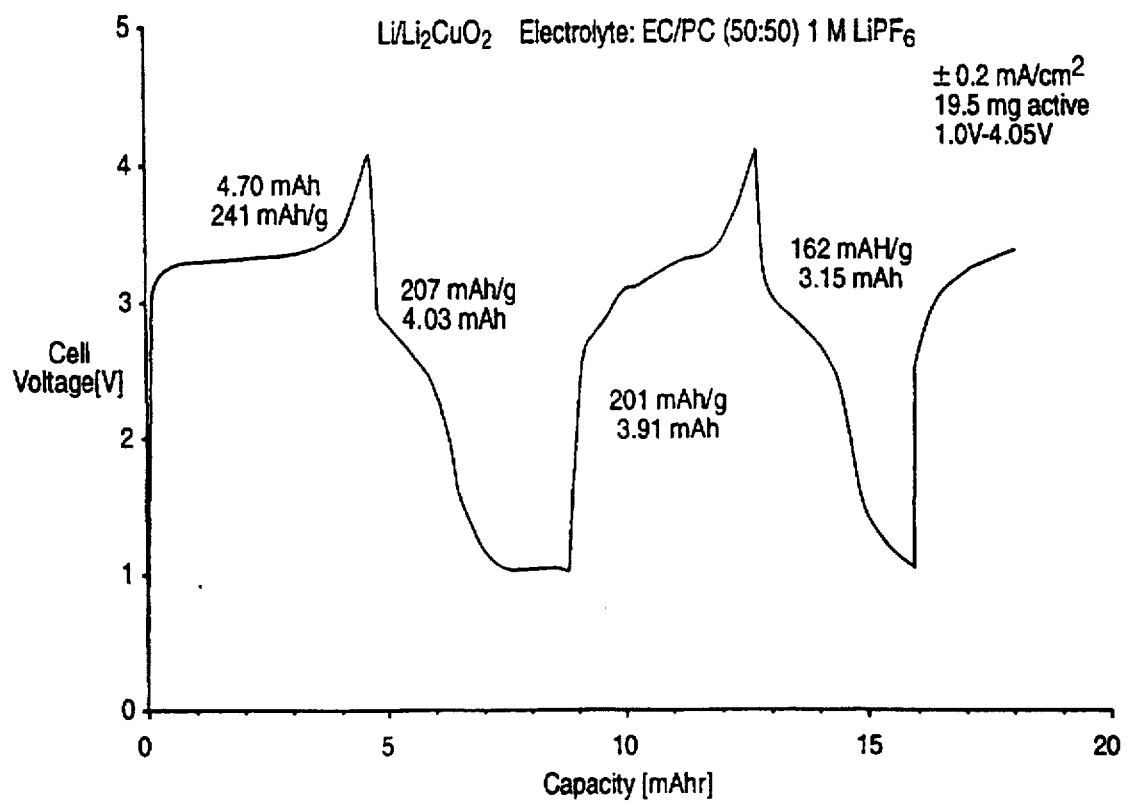
FIG. 1 is a voltage/capacity plot of $Li_2CuO_2$ cycled with a lithium metal anode using constant current cycling at 0.2 milliamp per square centimeter.

The invention provides a new positive electrode active material having increased capacity and a method for operating an electrochemical lithium cell or battery which has the new positive electrode active material composition. The positive electrode comprises first and second lithium-containing active materials which are different from one another. The invention provides the ability to overcome first cycle inefficiency typically observed when using a single lithium-containing metal chalcogenide by adding a small amount of a second lithium-containing metal chalcogenide, preferably lithium copper oxide.

Before further describing the method of the invention and the compound used in the method for reducing capacity loss of an electrode active material, it is useful to understand more fully the problem to which the invention is directed. Lithium manganese oxide is used as an example. Since not all the entire theoretical capacity of $Li_1Mn_2O_4$ is available for reaction the electrochemical activity is as follows:

Equation I: $Li_{1.0}Mn_2O_4 \rightarrow Li_{1-x}Mn_2O_4 + xLi^+ + xe^-$

Even assuming all the lithium is extracted, the specific capacity at best is 148 milliamp hours per gram. As described by those in the field, the best that one might hope for is reversible capacity on the order of 100 to 120 milliamp hours per gram. Such problems with conventional active materials are described by Tarascon in U.S. Pat. No. 5,425,932, using $LiMn_2O_4$ as an example. Similar problems are observed with $LiCoO_2$ and $LiNiO_2$. For example, if 1 lithium per $LiCoO_2$ or $LiNiO_2$ could be extracted, this would correspond to around 280 milliamp hours per gram. However, in all practical devices only around 0.5 lithium is cycled reversibly corresponding to only 140 milliamp hours per gram. Obviously, there is a tremendous difference between the theoretical capacity assuming all lithium is extracted from a lithium metal chalcogenide and the actual capacity observed during operation of a cell.

A number of attempts were made to increase the useable capacity of the conventional lithium metal oxide materials, yet such efforts further aggravate capacity loss and resulted in a lesser initial capacity. Accordingly, such efforts were essentially counter-productive. For example, an attempt was made to boost initial capacity by changing the relative proportions of lithium, manganese, and oxygen in the $LiMn_2O_4$ by, for example, replacing some manganese with lithium, changing the amount of oxygen, synthesizing a cation deficient spinel. These approaches resulted in materials having a significantly lower initial capacity than the spinel $LiMn_2O_4$. In addition, an attempt to increase the relative proportion of lithium results in a product which is not air stable, which is hygroscopic, and which decomposes readily through reaction with air and water. For example, it is possible to make $Li_xMn_2O_4$ with x greater than 1, however it must be made under inert gas with controlled humidity. In addition, it must be stored in such controlled environment, and battery fabrication also requires a controlled environment.

Before the present invention, the dilemma of solving the capacity problem has heretofore not been solved. The present invention provides lithium copper oxide active material which for the first time is used as a cathode active material where upon extraction of lithium, significant specific capacity is achieved. Such specific capacity achieved from lithium copper oxide is far in excess of the specific capacity observed from $Li_1Mn_2O_4$, a widely used cathode active material. In the method of the invention, $Li_{1+z}Mn_2O_4$, z>0, is prepared, in situ in a cell by deintercalation of lithium from $Li_2CuO_2$. Thus, the amount of lithium in $LiMn_2O_4$ is increased without the disadvantages associated with direct formation of lithium-rich $LiMn_2O_4$ described above. Advantageously, a cell may be prepared with air and moisture stable $Li_2CuO_2$ and $LiMn_2O_4$ without the need for a controlled environment. Then, in use, the $Li_2CuO_2$ is used to increase the capacity of the $LiMn_2O_4$. This same advantage is achievable when $Li_2CuO_2$ is used with other metal chalcogenides. The feature of air/moisture stability was verified for both $Li_2CuO_2$ and $LiMn_2O_4$. After over 2 weeks of exposure to ambient conditions in a room, neither active material showed any signs of degradation or oxidation. Each of the two ($LiMn_2O_4$ and $Li_2CuO_2$) advantageously has an open circuit voltage versus metallic lithium of greater than 3 volts (about 4.1 volts versus lithium for $LiMn_2O_4$ and about 3.4 volts versus lithium for $Li_2CuO_2$). As lithium is extracted from $Li_2CuO_2$ and $LiMn_2O_4$ during cell operation, each is at a higher potential and becomes even more air/moisture stable. When one lithium is removed per formula unit of the copper oxide, $Cu^{II}$ is oxidized to $Cu^{III}$. The reaction is as shown below:

Equation II: $Li_2Cu^{II}O_2 \rightarrow Li_{1.0}Cu^{III}O_2 + Li^+ + e^-$

The $Li_2CuO_2$ material has 245 milliamp hours per gram specific capacity upon electrochemical oxidation as per the reaction shown immediately above. The electrochemical extraction of lithium from $Li_2CuO_2$ has heretofore not been described. FIG. 1 shows a capacity in actual use of about 241 milliamp hours per gram where a $Li_2CuO_2$ cathode was tested in a cell comprising a lithium metal counterelectrode and an $EC:PC-LiPF_6$ electrolyte. The cell was operated using EVS technique with operation between 3.2 and 4.3 volts versus $Li/Li^+$ where one lithium is removed as described above.

It is also possible to conduct an electrochemical reaction according to Equation III below:

Equation III: $Li_2Cu^{II}O_2 \rightarrow LioCu^{IV}O_2 + 2Li^+ + 2e^-$

However, $Cu^{IV}$ is considered to be relatively unstable. Although this reaction was demonstrated during testing of the invention, this reaction (Equation III) is only partially reversible. Assuming reaction per Equation III was completely reversible, the capacity would be nearly double, that is around 490 milliamp hours per gram. This capacity is remarkable compared to the theoretical capacity of 148 milliamp hours per gram of $LiMn_2O_4$ conventional cathode material and the 100 to 120 milliamp hours per gram typically observed capacity of the $LiMn_2O_4$ active material.

A new positive electrode comprises the preferred lithium copper oxide active material and another active material. The first active material, the lithium copper oxide, has an electrochemical potential versus lithium which is less than the electrochemical potential versus lithium of the second active material. This is the case for a cell operating as per Equation II. If it were possible to operate a cell as per Equation III, the potential of the lithium manganese oxide and the lithium copper oxide may be about the same and is probably not reversible. The lithium copper oxide active material has a higher specific capacity (milliamp hours per gram), versus a metallic lithium counter-electrode, than the second active material. On a weight basis, the lithium copper oxide has a greater proportion of lithium than the second active material; the lithium copper oxide active material is relatively more air stable and less reactive with air and moisture compared to the second active material. Both the lithium copper oxide and second active materials are capable of releasing and inserting lithium ions. However, the lithium copper oxide active material does so at a lower voltage versus lithium, than that of the second active material. Accordingly, the lithium copper oxide is capable of oxidation and reduction of lithium ions at a lower voltage relative to the second active material. The second active material is selected from among lithium-containing metal chalcogenide compounds and is preferably lithium manganese oxide, $LiCoO_2$ and $LiNiO_2$. Preferably, the lithium copper oxide is represented by the nominal general formula $Li_2CuO_2$ and the exemplary second active material, lithium manganese oxide is represented by the nominal general formula $Li_1Mn_2O_4$. Upon oxidation and reduction, the lithium copper oxide is represented by the nominal general formula $Li_{2-x}CuO_2$ where x varies as x greater than or equal to zero and less than or equal to 2.

The amount of lithium which is reversibly removed and reinserted into the positive electrode active material is greatly enhanced and it may be possible to operate the spinel at its theoretical specific capacity. Any amount (more than zero) of the first active material (lithium copper oxide) constituent added to the positive electrode active material will improve performance. Generally, the positive electrode of the invention comprises about 1 percent to up to about 50 percent by weight of the $Li_2CuO_2$, with the balance constituted by the second active material (lithium metal oxide) for which performance is to be enhanced. Since the performance of the cell will be improved as any amount of the second active material (lithium metal oxide; i.e., $LiMn_2O_4$) is replaced by the first active material ($Li_2CuO_2$), there is no practical lower limit as to the amount of the first active material ($Li_2CuO_2$) so included, so long as it is greater than zero. Preferably, the maximum amount of the capacity enhancing constituent (i.e., $Li_2CuO_2$) is in the range of about 1 percent to 20 percent. For example, a mixture of about 10/90 parts by weight $Li_2CuO_2/LiMn_2O_4$ provides enough lithium copper oxide to nearly precisely compensate for the first cycle capacity loss of a lithium manganese oxide/graphite cell. This advantage is expected for a wide range of lithium metal chalcogenides, such as $LiNiO_2$ and $LiCoO_2$.

In another aspect, an amount of the first active material is used to both compensate for first cycle inefficiency and also to provide the ability to cycle at more than 1 voltage plateau. For example, a substantial amount of lithium copper oxide is substituted for the second active material (i.e., $LiMn_2O_4$) and the performance is greatly enhanced because the presence of the lithium copper oxide provides the ability to cycle the cell at 4 voltage and 3 voltage plateaus of the $LiMn_2O_4$. However, this added feature is not generally applicable to lithium metal chalcogenides, as explained below. This will be further understood by reference to the Examples and description following the Examples.

Positive electrodes comprising the new active material were prepared and tested in electrochemical cells and the results are reported in FIGS. 1 to 4. A typical cell configuration will be described with reference to FIG. 5.

Figure 5:
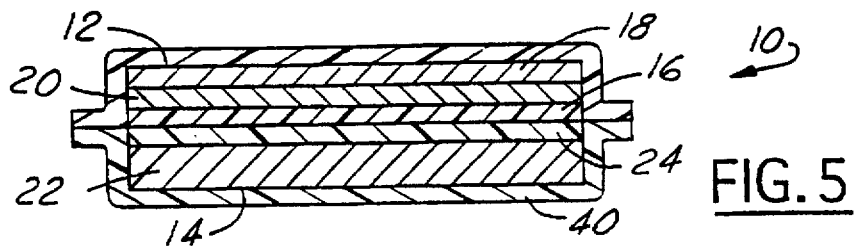
FIG. 5 is an illustration of a cross section of a thin battery or cell embodying the invention.

A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 5, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder composition is desirably a binder, such as polymers, a paste containing the binder, active material, and carbon, is coated onto a current collector.

Positive Electrode

A positive electrode containing the lithium copper oxide active material of the invention is prepared by the following method. For the positive electrode, the content was as follows: 50 to 90 percent by weight active material ($Li_2CuO_2$); 5 to 30 percent carbon black as the electric conductive diluence; and 3 to 20 percent binder. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the lithium copper oxide active material, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

Electrolyte

The electrolyte used to form a completed cell was a combination of EC/DMC. This is preferred when a carbon anode is used. That is, ethylene carbonate (EC) and dimethyl carbonate (DMC). The ratio of EC:DMC was about 2:1 by weight. Generally, when a lithium metal anode is used, the electrolyte is EC:PC (propylene carbonate) in 50:50 by weight ratio. In both cases, the salt used with the solvent was 1 molar $LiPF_6$. Positive and negative electrodes were maintained in a separated condition using a fiber glass layer. Such separation can also be achieved using a layer of Celgard™, Hoechst-Celanese Corp., Celgard 2400™, porous polypropylene, 25 microns thick.)

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and binder in the proportions as described above for the positive electrode. Representative, but not limiting, examples include coke, graphite, $WO_3$, $Nb_2O_5$, and $V_6O_{13}$. It is thought that $Li_xCuO_2$ may also be used as the negative electrode active material; however, the voltage would likely be low, as in, for example, $Li_1CuO_2$ counter-electrode. In a preferred embodiment, the negative electrode active material is graphite particles. For test purposes, for determining capacity of a positive electrode, test cells were fabricated using lithium metal active material. Accordingly, the cells assembled for testing and the results described hereinbelow are based on the positive electrode active material comprising the $Li_2CuO_2$ of the invention tested against a lithium metal counter-electrode. When forming cells for use in batteries, it is preferred to use a non-metallic intercalation graphite electrode. The preferred negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

Base Case—Comparative Case

As stated earlier, for the theoretical electrochemical extraction according to: $Li_1Mn_2O_4$ goes to $Li_0Mn_2O_4$, the theoretical specific capacity is 148 milliamp hours per gram. However, this theoretical capacity is not realized during operation of an electrochemical cell. Rather, during electrochemical extraction, the effected specific capacity is limited to the extraction of 0.8 atomic units of lithium per atomic formula unit of $LiMn_2O_4$. Accordingly, the electrochemical reaction is designated by $Li_1Mn_2O_4$ goes to $Li_{0.2}Mn_2O_4$ providing 110 to 120 milliamp hours per gram, with 0.8 atomic units of lithium extracted. Then, during cycling of a cell additional capacity loss occurs and less than 0.8 units of lithium ion is cycled. (See above regarding Tarascon, U.S. Pat. No. 5,425,932.) Taking the case of the cell where the $LiMn_2O_4$ cathode is cycled with graphite, on first charge there is utilized the equivalent of about 375 milliamp hours per gram of the graphite's specific capacity. On first charge, there is extracted 125 milliamp hours per gram from the $LiMn_2O_4$ which is inserted into the graphite anode providing 375 milliamp hours per gram. Note the mass ratio of 375:125 equivalent to 3:1. After the first cycle, approximately 15 percent capacity is lost. After the first cycle, the capacity of the $LiMn_2O_4$ falls to approximately 106 milliamp hours per gram and that of the graphite anode to approximately 318 milliamp hours per gram cycling on the 4 volt plateau for the lithium manganese oxide. This results in a loss compared to theoretical of (148−106)/148 or 28 percent.

EXAMPLE I

To overcome the deficiencies cited above with respect to the base case Comparative Example, a cell was prepared using lithium copper oxide which provides on the order of twice the specific capacity of the conventional lithium manganese oxide cathode material, but at a slightly lower voltage, on the order of about 3 volts, more specifically 3.4 to 3.5 volts on lithium extraction from $Li_2CuO_2$, as compared to 4 volts for the lithium manganese oxide. It is shown by this example that in a lithium ion battery, it is possible to provide with a small amount of lithium copper oxide combined with the lithium manganese oxide, the ability to overcome the first cycle inefficiency typically observed when using lithium manganese oxide cathode in conjunction with a carbon anode. The lithium copper oxide intercalates more lithium at lower voltages relative to conventional lithium metal oxide active material, such as lithium manganese oxide. At such lower voltages, the lithium copper oxide is advantageously air and moisture stable.

Preparation of $Li_2CuO_2$

A preferred procedure for forming the $Li_2CuO_2$ compound active material will now be described. The basic procedure comprises conducting a reaction between lithium hydroxide and copper oxide. The lithium hydroxide is of the formula LiOH and the copper oxide starting material formula is CuO. The copper oxide starting material (CuO) is available as a 99 percent pure compound from Aldrich Chemical Company. Lithium hydroxide (LiOH) is available from a number of chemical outfits including Fluka and Aldrich. Both the copper oxide and lithium hydroxide are in powder or particle form. More than one batch of the active material was prepared. A typical batch comprised a mixture of 9.576 grams of lithium hydroxide (LiOH) and 7.96 grams of copper oxide (CuO). Theoretical it is possible to use stoichiometric amounts of the copper oxide and lithium hydroxide. However, it is preferred to use about 5 percent excess by weight of lithium hydroxide as compared to what is required in a stoichiometric formulation. In this procedure, near stoichiometric amounts of the copper oxide were mixed with lithium hydroxide for about 30 minutes. However, prior to such mixing the lithium hydroxide salt was predried at about 1200° C. for about 24 hours. Then the lithium salt was thoroughly ground to bring its particle size closer to that of the particle size of the copper oxide as received (less than 5 microns). The mixture of lithium hydroxide and copper oxide were then pressed into pellets at a pressure in excess of about 10 tons per square inch. The pellets were put in an alumina crucible and heated in an inert atmosphere at a rate of 2° C. per minute. Such heating was conducted to achieve 455° C. temperature whereupon the mixture was held at such temperature for 12 hours. Then the temperature was ramped again at the same rate to achieve a temperature of 825° C. and then held at such temperature for an additional 24 hours. The furnace containing the mixture was permitted to cool down and then the entire procedure was repeated with an initial ramp up heating at a rate of 2° C. per minute to achieve the 455° C. temperature which was held for 6 hours, and then the same ramp rate to achieve 650° C. for 6 hours, and then the same ramp rate to achieve 825° C. for 12 hours.

Figure 3:
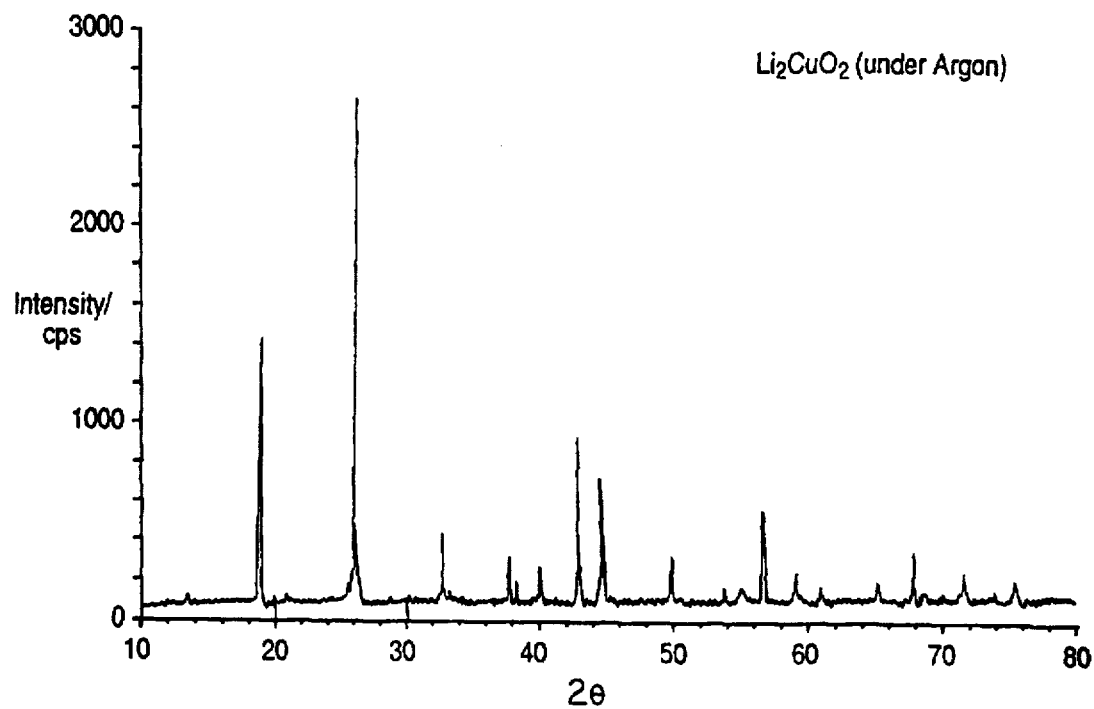
FIG. 3 shows the result of an x-ray diffraction analysis of the $Li_2CuO_2$ prepared according to the invention, conducted using the CuKα radiation, λ=1.5418 Å type radiation.

The x-ray pattern as shown in FIG. 3 showed no peaks due to the presence of either copper oxide or lithium hydroxide precursor, which means that the reaction is essentially entirely completed. Atomic Absorption Spectroscopy showed that the lithium content of the final product was 12.29 percent compared to a theoretical calculation of 12.68 percent. This demonstrates that the product of the invention, according to CuKα radiation, as shown in FIG. 3, was indeed the nominal general formula $Li_2CuO_2$. The term "nominal general formula" refers to the fact that the relative proportion of atomic species may vary slightly on the order of 2 percent to 5 percent, or more typically, 1 percent to 3 percent. For example, nominal $LiMn_2O_4$ may be $Li_{1.05}Mn_2O_4$.

The entire procedure of preparation was conducted in an inert atmosphere which was argon, excluding the obtaining of the x-ray pattern. It should be noted that the $Li_2CuO_2$ of the invention may also be prepared from lithium oxide and copper oxide starting materials according to the reaction:

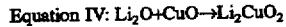

Equation IV: $Li_2O + CuO \rightarrow Li_2CuO_2$

It is also possible to prepare the $Li_2CuO_2$ product according to the reaction:

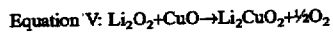

Equation V: $Li_2O_2 + CuO \rightarrow Li_2CuO_2 + \frac{1}{2}O_2$

However, it was preferred to prepare the $Li_2CuO_2$ according to the above described Example I using lithium hydroxide and copper oxide according to the reaction:

Equation VI: $2LiOH + CuO \rightarrow Li_2CuO_2 + 1H_2O$

Preparation of $LiMn_2O_4$

The $Li_xMn_2O_4$ powders which form the basis of the active material for the cathode, can be prepared by a method as described by Barboux, Tarascon et al in U.S. Pat. No. 5,135,732, issued Aug. 4, 1992 and incorporated by reference in its entirety. This reference is illustrative of a suitable method and is not limiting. This method produced active material which is used as the cathode (positive electrode) active material. Such methods are used to produce positive electrodes for use with negative electrodes of metallic lithium.

EXAMPLE II

Figure 2:
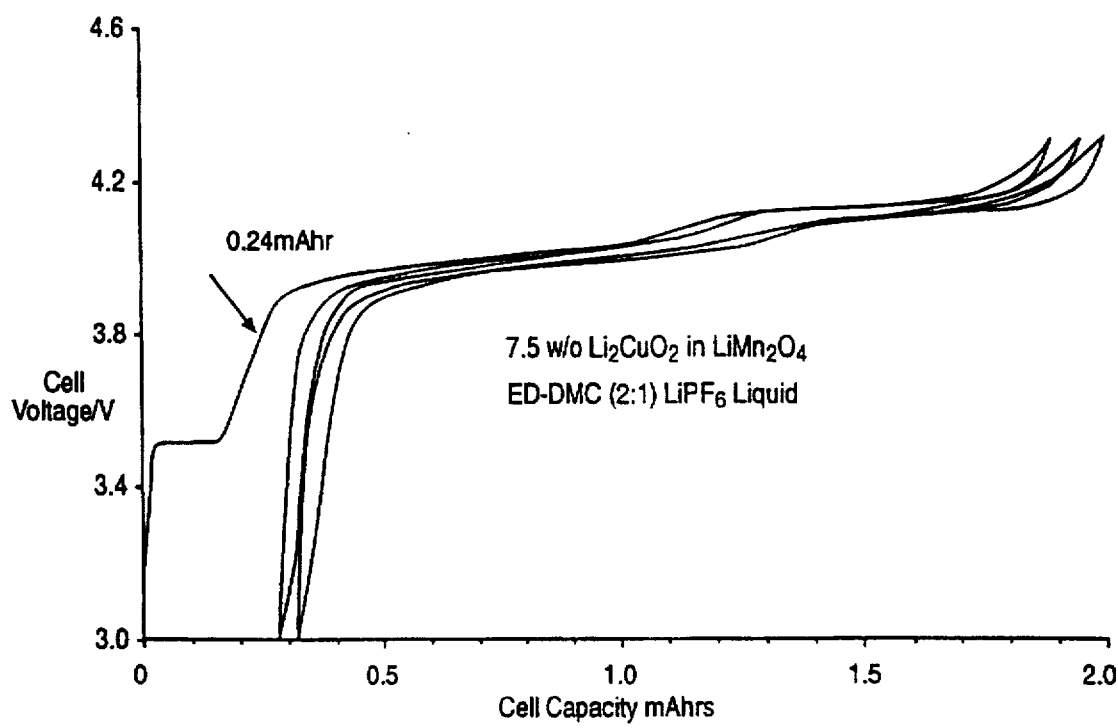
FIG. 2 is a voltage/capacity plot for a cathode active material having on the basis of 100 parts by weight, about 7.5 parts $Li_2CuO_2$ and about 92.5 parts $LiMn_2O_4$ active material in a cathode, cycled against a metallic lithium anode using the EVS technique.

The $Li_2CuO_2$ prepared in accordance with Example I was combined with $LiMn_2O_4$ to form a positive electrode. The mixed oxide $Li_2CuO_2/LiMn_2O_4$ cathode comprised 7.5 weight percent $Li_2CuO_2$ and 92.5 weight percent $LiMnO_2$ and was tested in an electrochemical cell. The positive electrode was prepared as described immediately above under the section designated "Positive Electrode". The negative electrode was metallic lithium. The cell was cycled between about 3.2 and 4.3 volts with performance as shown in FIG. 2. FIG. 2 is an EVS (Electrochemical Voltage Spectroscopy) voltage/capacity profile. The electrolyte in the cell comprised ethylene carbonate (EC) and dimethyl carbonate (DMC) (weight ratio of EC:DMC is 2:1) with a 1 molar concentration of $LiPF_6$ salt. The anode (negative electrode) and cathode (positive electrode) are maintained spaced apart by a separator of glass which is interpenetrated by the EC/DMC mixed solvent and the salt. In FIG. 2, 7.5 percent by weight of $Li_2CuO_2$ substituted for the $LiMn_2O_4$ compensates for at least a portion of the first cycle capacity loss suffered by the $LiMn_2O_4$ active material encountered during the first cycle of a lithium ion battery. Lithium ion battery is also referred to as a rocking chair battery. The $Li_2CuO_2$ essentially provides a quantity of additional lithium as indicated by the arrow on the first cycle charge shown in FIG. 2. The horizontal plateau at about 3.5 volts represents extraction of lithium from $Li_2CuO_2$. Lithium continues to be removed up to about 3.9 volts. Thereafter, lithium is removed from $Li_2Mn_2O_4$. Upon subsequent discharge, lithium is reinserted into the lithium metal oxide at the 4 volt plateau. Lithium is not reinserted into the $Li_1CuO_2$ at a plateau below 4 volts. No such reinsertion plateau is shown in FIG. 2.

The data shown in FIG. 2 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochimica Acta, Vol. 40, No. 11, at 1603 (1995). FIG. 2 clearly shows and highlights the very high and unexpected amount of reversible lithium ion capacity for the $Li_2CuO_2/LiMn_2O_4$ active material of the invention.

EXAMPLE III

Figure 4:
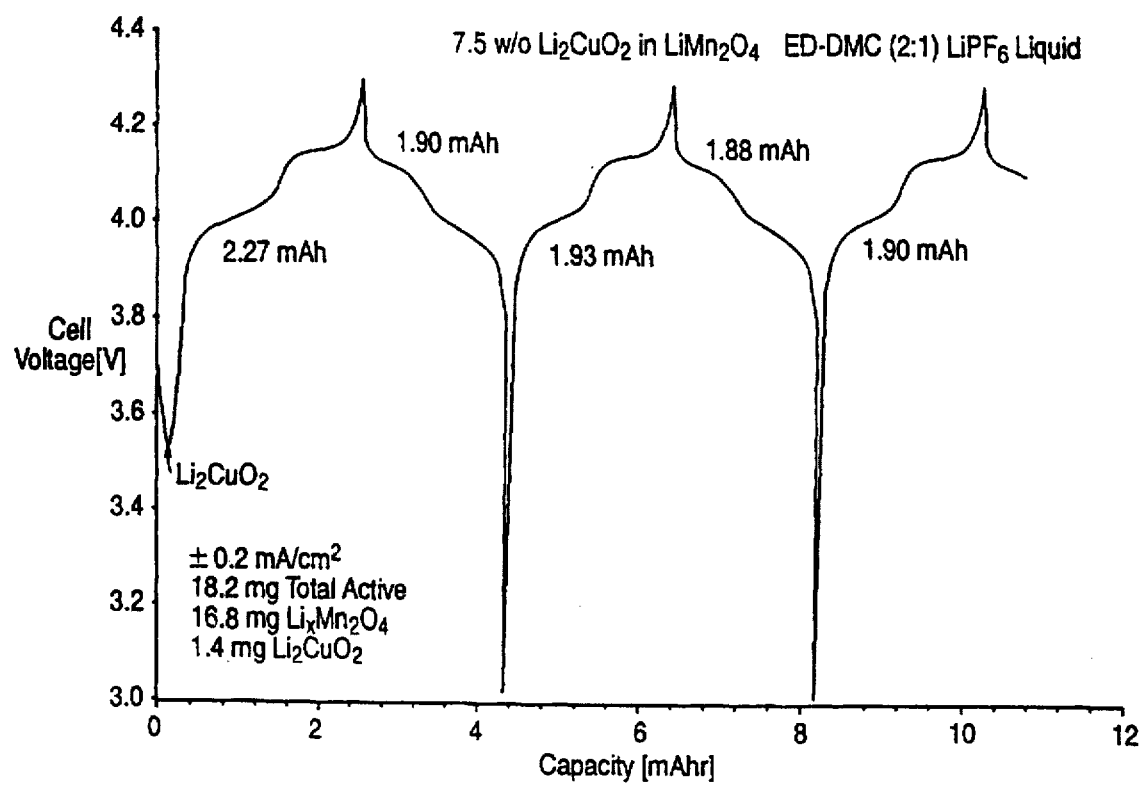
FIG. 4 is a voltage/capacity plot for a cathode active material having on the basis of 100 parts by weight, about 7.5 parts $Li_2CuO_2$ and about 92.5 parts $LiMn_2O_4$ active material in a cathode, cycled against a metallic lithium anode, based on constant current cycling at ±0.2 milliamp/$cm^2$.

The $Li_2CuO_2/LiMn_2O_4$ cathode of Example II was cycled with a lithium anode and the 2:1 EC:DMC-$LiPF_6$ electrolyte, using constant current cycling at about 0.2 milliamp hours per square centimeter. The positive electrode contained about 1.4 milligrams of the $Li_2CuO_2$ active material and about 16.8 milligrams of $LiMn_2O_4$ active material, for a total of about 18.2 milligrams total active material in the cathode (positive electrode). The electrolyte is as per Example II. As shown in FIG. 4, during initial charge on the first cycle, lithium ions are deintercalated from $Li_2CuO_2$. At about 3.5 volts (3.2 to 4 volts) about 1 atomic unit of lithium has been removed per formula unit of the original lithium copper oxide ($Li_2CuO_2$). Consequently, this positive electrode material corresponds to about $Li_1CuO_2$. Then at about 4 volts, about 0.78 atomic units of lithium has been removed per formula unit of the original lithium manganese oxide ($LiMn_2O_4$). As a result, this positive electrode material corresponds to $Li_{0.22}Mn_2O_4$. In this "fully charged" condition, the electrochemical potential versus lithium of the positive electrode is about 4.3 volts. The deintercalation of lithium from $Li_2CuO_2$ and $LiMn_2O_4$ represents approximately 2.27 milliamp hours. This is equivalent to about 125 milliamp hours per gram of total active material, 115 milliamp hours per gram of $LiMn_2O_4$ active material. Next, the cell is discharged and shows a slight hysteresis whereupon a quantity of lithium is reintercalated into the $Li_{0.22}Mn_2O_4$. The reintercalation corresponds to approximately 1.90 milliamp hours proportional to the intercalation of 0.76 atomic units of lithium into the lithium manganese oxide. Importantly, nearly all of the 0.78 units of lithium removed from $LiMn_2O_4$ has been reintercalated. At the bottom of the curve corresponding to 3 volts, the positive electrode active material corresponds to about $Li_{0.98}Mn_2O_4$, $Li_1CuO_2$. The cell is then subsequently recharged whereupon a quantity of lithium ions is again deintercalated from $LiMn_2O_4$ corresponding to approximately 1.93 milliamp hours. Returning to the region of approximately 4.3 volts. The cell is again discharged and recharged and then the test was terminated.

Applying the results of FIGS. 1 and 4 to a typical lithium containing metal oxide cathode and graphite anode lithium ion cell, the benefit of the combined composite positive electrode active material can be understood. Based on the first cycle typical capacity loss for such lithium ion cell being 15 percent on first charge 120 milliamp hours per gram is extracted from the positive electrode providing 360 milliamp hours per gram upon insertion of lithium into the negative electrode. On first discharge the equivalent of about 102 milliamp hours per gram is realized at the positive electrode upon reintercalation and about 306 milliamp hours per gram is extracted from the graphite due to predominantly the irreversible reactions at such graphite (carbon) negative electrode. Such quantity of irreversibility is satisfied by extracting lithium from the $Li_2CuO_2$ on first charge to compensate for the 15 percent capacity loss. Based on the fact that the $Li_2CuO_2$ contains 13 percent by weight lithium and the $LiMn_2O_4$ contains only 4 percent by weight lithium, one can see that the substitution of 1 unit of weight of lithium manganese oxide provides three times the amount by weight of lithium. The significant impact of the substitution in terms of atomic formula units and weight proportions will be further described below in connection with examples showing substitutions containing 5/95 $Li_2CuO_2/LiMn_2O_4$, 10/90 $Li_2CuO_2/LiMn_2O_4$, and 40/60 $Li_2CuO_2/LiMn_2O_4$.

Figure 6:
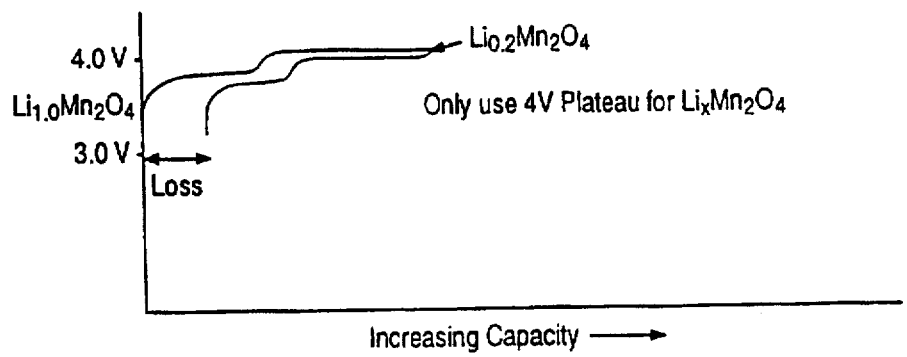
FIGS. 6 through 8 illustrate respective shapes of voltage/capacity plots for positive electrodes having the following parts by weight: 100 percent $LiMn_2O_4$ (FIG. 6); 40/60 $Li_2CUO_2/LiMn_2O_4$ (FIG. 7); and 10/90 $Li_2CuO_2/Li_1Mn_2O_4$ (FIG. 8).

As per the Comparative Case, a battery with an $Li_1Mn_2O_4$ positive electrode has an available capacity of only on the order of 110 to 125 milliamp hours per gram because it is not possible to extract a full atomic unit of lithium for cycling, only about 0.8 atomic units are available for cycling; and a further loss occurs after the first cycle. Accordingly, the total loss compared to the theoretical capacity is (148–106)/148, or 28 percent. This may be seen by reference to FIG. 6 which illustrates the shape of the voltage/capacity plot for a conventional $LiMn_2O_4$ positive electrode. As can be seen with reference to FIG. 6, only the 4 volt plateau is used for $LiMn_2O_4$.

Figure 7:
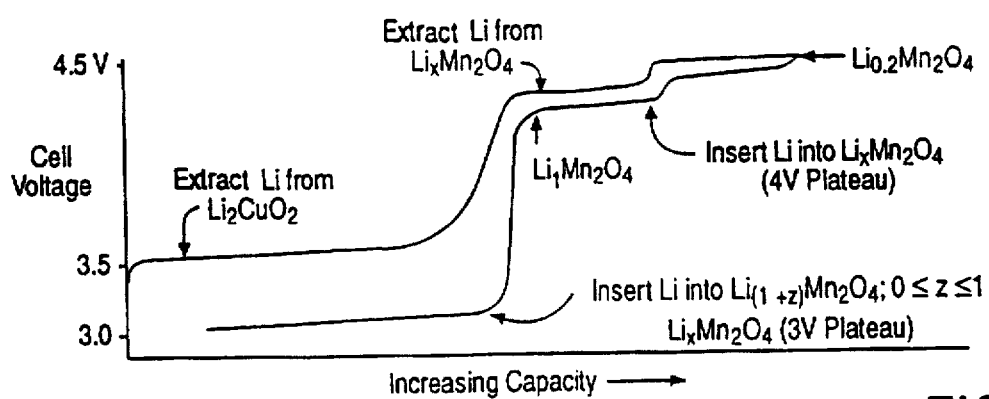

In contrast, consider the case of 40/60 parts by weight $Li_2CuO_2/LiMn_2O_4$ illustrated by the shape of the voltage/capacity plot shown in FIG. 7. From the 40 weight percent $Li_2CuO$, it is possible to extract 1 atomic unit of lithium corresponding to 245 milliamp hours per gram; for the 40 weight percent this provides 98 milliamp hours per gram. From the 60 weight percent $LiMn_2O_4$ it is possible to extract about 0.8 atomic units of lithium corresponding to 125 milliamp hours per gram available capacity; for the 60 weight percent this provides 75 milliamp hours per gram. The total of the two positive electrode active materials is 173 milliamp hours per gram. Assuming the same mass ratio of negative electrode and positive electrode as in the Comparative Case, the first charge insertion of lithium into the anode provides 375 milliamp hours per gram. The ratio is 375:173, corresponding to 2.17:1. After the first cycle, such a configuration loses 15 percent capacity resulting in 147 milliamp hours per gram at the positive electrode and 319 milliamp hours per gram at the negative electrode. This means that 147 milliamp hours per gram is available for the cell discharge. Under these conditions, 0.2 atomic units of lithium is left in the positive electrode corresponding to $Li_{0.2}Mn_2O_4$. In this case, the cell is cycled at both the 4 volt and 3 volt plateau of lithium manganese oxide, as shown in FIG. 7. On cell discharge, some of the lithium will cycle back on the 4 volt plateau of the lithium manganese oxide and the balance will cycle back on the 3 volt plateau of the lithium manganese oxide. The combination of available capacities at the 3 volt and 4 volt plateau is 164 milliamp hours per gram of positive electrode active material. This can be proven by calculating the 3 volt and 4 volt plateau capacity which may be accommodated as follows: 125 milliamp hours per gram×60 weight percent=75 milliamp hours per gram available on the 4 volt plateau; and 148 milliamp hours per gram×60 weight percent=89 milliamp hours per gram available for accommodation on the 3 volt plateau. The 75 milliamp hours per gram added to the 89 milliamp hours per gram constitutes 164 milliamp hours per gram which can be accommodated between the two plateaus which is in excess of the 147 milliamp hours per gram available for cell discharge as stated above. This means that during cell discharge, the lithium manganese oxide at the 4 volt plateau will intercalate on the order of about 0.8 units of lithium going from $Li_{0.2}$ to $Li_{1.0}Mn_2O_4$ and then at the 3 volt plateau the $Li_1OMn_2O_4$ will go to $Li_1+zMn_2O_4$ where z is greater than 0 and less than or equal to 1. Accordingly, this cell configuration advantageously boosts the amount of lithium ion intercalated and deintercalated from the lithium manganese oxide to a value greater than 1. In this case, as can be seen, both the 4 volt and 3 volt plateaus of the lithium manganese oxide have been utilized. The 4 volt plateau has been used completely and most of the 3 volt plateau has been used. This provides a substantial improvement in capacity in view of the fact that it was only required to use a mass ratio of 2.17 to 1 to achieve this remarkable result. This corresponds to a substantial saving of active material over the Comparative Case, in other words, a substantial increase in cell capacity for the same weight of electrode material.

Figure 8:
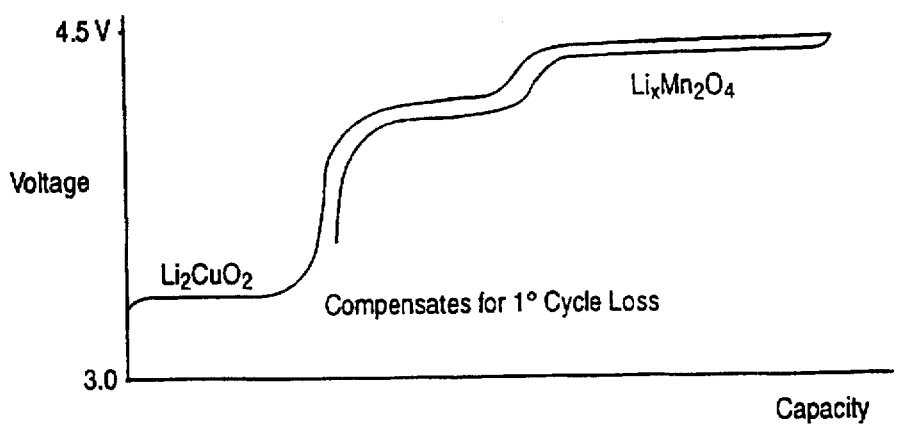

Referring to FIG. 8 there is illustrated the case of 10/90 parts by weight $Li_2CuO_2/LiMn_2O_4$ voltage/capacity plot. As can be seen in FIG. 8, the 10 parts by weight lithium copper oxide active material nearly precisely compensates for the first cycle capacity loss of the lithium manganese oxide. Similar to the analysis and derivation described with reference to FIG. 7, in FIG. 8 the 10 percent by weight lithium copper oxide provides 24.5 milliamp hours per gram and the 90 percent by weight lithium manganese oxide provides 112.5 milliamp hours per gram. The total for the two active materials of the positive electrode is 137 milliamp hours per gram. Assuming the same mass ratio of the negative electrode and the positive electrode, as in the earlier cases, the first charge insertion of lithium into the anode provides 375 milliamp hours per gram. The ratio is 375:131, corresponding to 2.74:1. After the first cycle, the configuration loses 15 percent capacity resulting in 116 milliamp hours per gram at the positive electrode and 319 milliamp hours per gram at the negative electrode. This means that 116 milliamp hours per gram is available for cell discharge. Under these conditions, 0.2 atomic units of lithium is left in the positive electrode corresponding to $Li_{0.2}Mn_2O_4$. In this case, the cell is cycled at the 4 volt plateau, where the 4 volt plateau capacity which may be accommodated is as follows: 125 milliamp hours per gram×90 weight percent=113 milliamp hours per gram. As can be seen, the available "space" at the 4 volt plateau (113 milliamp hours per gram) is almost precisely equal to 116 milliamp hours per gram available for cell discharge. This mode of operation provides a substantial improvement in capacity since it is only required to use a mass ratio of 2.74:1 to achieve this remarkable result. For the same electrode weight, a small amount (10 percent by weight) $Li_2CuO_2$ nearly precisely compensates for the first cycle loss as illustrated by the diagram of FIG. 8.

Batteries made with this technology are made in the discharged state with excess lithium capacity and need a conditioning charge (pre-charge) before use. In the initial condition (pre-charged state), anodes of the invention are essentially free of lithium and ions thereof. Such batteries are, therefore, inherently more stable and relatively less reactive than batteries containing $Li_xMn_2O_4$, x>1, or lithium metal.

Advantageously, when fully discharged, only a minor amount of the anode active material, such as graphite or carbon, is constituted by lithium ions from the $Li_2CuO_2$ cathode because the insertion is essentially reversible. Thus, at worst, only a minor amount of lithium is lost. Thus, when fully discharged, only a minor amount or probably less than 10 percent to 15 percent of the amount of $Li^+$ at full-charge may remain in the carbon-based anode when fully discharged. The "lost" lithium is generally assumed (at least during the first cycle) to be consumed during creation of an "ionically conducting passivation layer" on the carbon surface. The $Li^+$ ions transferred to the anode are releasably retained within the anode structure. In principle, no free, metallic lithium is present in the anode ever, provided the electrode is not overloaded with lithium (balanced cells required) or lithium ions are transferred to the anode faster than they can diffuse into the carbon electrode. Fully discharged means that the battery has reached the lowest allowed voltage. In theory, in the fully discharged state, no lithium ions are present in the anode, at least in principle.

To achieve a useable potential difference, the (positive electrode) is electrochemically oxidized, while the anode (negative electrode) is reduced. Thus, during charging, a quantity (x) of lithium ions ($Li^+$) leave the $Li_2CuO_2$ active material and then leave the $Li_1Mn_2O_4$ active material of the positive electrode and the positive electrode is oxidized, increasing its potential; during charging, the lithium ions are accepted at or intercalated into the carbon-based negative electrode which is reduced, and the negative electrode has a potential very close to the lithium metal potential, which is zero volts. A typical graphite electrode can intercalate up to about 1 atom of lithium per each of 6 carbons, that is, $Li_0C_6$ to $Li_1C_6$. During discharging, the reverse occurs, and a quantity of (x) of lithium ($Li^+$) ions leave the negative electrode, increasing its potential. During discharge, the lithium ions are accepted (intercalated) back into the manganese oxide active material of the positive electrode at one or more voltage levels; the positive electrode active material is reduced, and its potential is reduced.

In summary, lithium ion cells comprising conventional lithium metal oxide active material experience some first cycle loss predominantly due to irreversible reactions at the carbon (graphite) electrode. For conventional cathode material, such as $LiMn_2O_4$, $LiCoO_2$, $LiNiO_2$, and other lithium chalcogenides, this means that after the first cycle, a portion of the cathode active material is effectively unusable, and is essentially present as dead weight in the cell. This is undesirable because the maximum capacity is desired from the cell for the minimum amount of weight. For applications such as electric vehicles and miniaturized electronic devices, weight and volume reduction for active materials are of significant and often paramount concern. The excess lithium capacity as indicated by the arrow in FIG. 2 is evident on first cycle charging when an irreversible quantity of lithium ions is removed from the $Li_2CuO_2$ positive electrode active material for delivery to the negative electrode. The initial capacity in milliamp hours per gram is greater than the reversible capacity, with the difference signifying the lithium irreversibly removed from the $Li_2CuO_2$ and constituting the excess capacity. Upon subsequent charge and discharge, the amount of lithium which is reversibly removed and reinserted into the positive electrode $LiMn_2O_4$ active material is thought to be greatly enhanced and even approaching its depth of discharge. Any amount of $Li_2CuO_2$ constituent added to the positive electrode active material will improve performance. Generally, the positive electrode of the invention comprises up to about 50 percent by weight of the $Li_2CuO_2$, with the balance constituted by the second lithium metal oxide active material (i.e., $LiMn_2O_4$). Since the performance of the cell will be improved as any amount of $LiMn_2O_4$ is replaced by the $Li_2CuO_2$, there is no practical lower limit as to the amount of $Li_2CuO_2$ so included so long as it is greater than zero. Preferably, the maximum amount of such $Li_2CuO_2$ constituent is in the range of 1 percent to 20 percent.

The powerful influence of the addition of even a small amount of $Li_2CuO_2$ can be further understood by reference to weight percentages, as per Table I.

TABLE I

| (1) Atom | (2) Atomic Unit | (3) Atomic Weight | (4) Col 2 × 3 | (5) Weight Fraction | (6) Weight Percent |
|---|---|---|---|---|---|
| $Li_2CuO_2$ | | | | | |
| Li | 2 | 7 g | 14 | 14/110 | 13 |
| Cu | 1 | 64 g | 64 | 64/110 | 58 |
| O | 2 | 16 g | 32 | 32/110 | 29 |
| | | | 110 g | | 100 |
| $LiMn_2O_4$ | | | | | |
| Li | 1 | 7 g | 7 | 7/181 | 4 |
| Mn | 2 | 55 g | 110 | 110/181 | 61 |
| O | 4 | 16 g | 64 | 64/181 | 35 |
| | | | 181 g | | 100 |

The $Li_2CuO_2$ contains 2 atomic units of lithium for each formula unit of the oxide, corresponding to 40 atomic percent lithium (2/5 = 0.4).
The $LiMn_2O_4$ contains 1 atomic unit of lithium for each formula unit of the oxide, corresponding to about 14 atomic percent lithium (1/7 = 0.14).

Thus, the $Li_2CuO_2$ has 2 atomic units of lithium per formula unit of the copper oxide (metal oxide); and 13 weight percent lithium per formula unit of the copper oxide. The $Li Mn_2O_4$ has only 1 atomic unit of lithium per formula unit of the manganese oxide (metal oxide); and only 4 weight percent lithium per formula unit of $LiMn_2O_4$. In the case of $LiMn_2O_4$, not all of the single atomic unit of lithium is reversibly cycleable due to irreversible loss. Thus, the amount of lithium reversibly cycled with the $LiMn_2O_4$ material is less than 1 atomic unit of lithium. In contrast, the $Li_2CuO_2$ has 2 atomic units available for cycling; even assuming that only half the lithium in $Li_2CuO_2$ is cycled, the amount of lithium cycled per formula unit of metal oxide is significantly greater than in the case of $LiMn_2O_4$. It is thought that this same advantage exists over all other known and commonly used metal oxides, such as, $LiCoO_2$ and $LiNiO_2$.

Advantageously, on initial charge, the lithium is removed from both the $Li_2CuO_2$ and the $LiMn_2O_4$ and the manner in which removal of ions from the positive electrode occurs depends on the voltages of these individual materials. Lithium ions will be removed from the material with the lowest voltage first ($Li_2CuO_2$). This also means that the lithium ions may be reinserted into only one of the materials. That is, for example, reinserted into the $LiMn_2O_4$, but not reinserted back into the lithium copper oxide (first active material). This also means that the lithium ions may be reinserted into the $LiMn_2O_4$ at a first voltage and then if the voltage of the $LiMn_2O_4$ drops, reinsertion at the lower voltage is also possible. This phenomenon was demonstrated with respect to the 40/60 composition of $Li_2CuO_2$/$LiMn_2O_4$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A lithium ion battery which comprises a positive electrode and a negative electrode; said negative electrode comprising an active material consisting of an intercalation material in a pre-charge state; said positive electrode comprising an active material consisting of first and second lithium-containing intercalation compounds which are different from one another, the fist being a lithium copper oxide compound and the second being a lithium metal chalcogenide compound other than lithium copper oxide.

2. The battery according to claim 1 wherein said lithium copper oxide has two lithium ions per formula unit of copper oxide.

3. The battery according to claim 1 wherein said lithium copper oxide is a compound represented by the nominal general formula $Li_2CuO_2$.

4. The battery according to claim 3 wherein said lithium copper oxide is capable of extraction and insertion of a quantity of x of lithium ions and is represented by the nominal general formula $Li_{2-x}CuO_2$, and where during cycling of the battery (charge and discharge) the value of x varies as $0 \leq x \leq 2$.

5. The battery according to claim 4 wherein the value of x varies as $0 \leq x \leq 1$.

6. The battery according to claim 1 wherein said lithium copper oxide active material is present in an amount which is less than half the combined weight of said first and second active materials.

7. The battery according to claim 1 wherein said second compound material is a lithium manganese oxide compound.

8. The battery according to claim 1 wherein said second compound is a spinel represented by the nominal general formula $LiMn_2O_4$.

9. The battery according to claim 1 wherein said negative electrode active material is selected from the group consisting of transition metal oxide, metal chalcogenide, carbon, graphite, and mixtures thereof.

10. The battery according to claim 1 wherein said first compound is characterized by an electrochemical potential versus lithium which is less than the electrochemical potential of said second compound, and further characterized by electrochemical deintercalation of lithium ions at a lower voltage versus lithium than the voltage at which said second compound deintercalates lithium ions during charging cycle of said battery; said negative electrode active material characterized by intercalating said deintercalated lithium ions during said charging cycle and by subsequent deintercalation of lithium ions on discharge cycle; and said second compound characterized by reintercalation of said discharge cycle lithium ions from said negative electrode active material, at a voltage higher than said characteristic lower voltage of said first compound.

11. The battery according to claim 1 wherein said negative electrode active material is selected from the group consisting of carbon, graphite, and mixtures thereof.

* * * * *